(12) United States Patent
Dehais

(10) Patent No.: US 8,525,702 B2
(45) Date of Patent: Sep. 3, 2013

(54) METHOD AND DEVICE FOR DETECTING ABSENCES OF MANUAL AND AUTOMATIC PILOTING OF AN AIRCRAFT

(75) Inventor: Frédéric Dehais, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 532 days.

(21) Appl. No.: 12/934,311

(22) PCT Filed: Mar. 23, 2009

(86) PCT No.: PCT/FR2009/000307
§ 371 (c)(1),
(2), (4) Date: Sep. 24, 2010

(87) PCT Pub. No.: WO2009/125091
PCT Pub. Date: Oct. 15, 2009

(65) Prior Publication Data
US 2011/0018739 A1    Jan. 27, 2011

(51) Int. Cl.
    *G08B 23/00* (2006.01)
(52) U.S. Cl.
    USPC ............................................. 340/963
(58) Field of Classification Search
    USPC ..................... 340/963, 945; 701/8, 9, 11
    See application file for complete search history.

(56) References Cited

U.S. PATENT DOCUMENTS

| | | | |
|---|---|---|---|
| 3,411,132 A | 11/1968 | Priestley | |
| 5,170,163 A * | 12/1992 | Collins et al. | 340/967 |
| 5,243,339 A | 9/1993 | Graham et al. | |
| 7,990,285 B2 * | 8/2011 | Daveze et al. | 340/963 |
| 2005/0075763 A1* | 4/2005 | Brigode | 701/11 |
| 2009/0005920 A1* | 1/2009 | Colomer | 701/14 |
| 2010/0045486 A1 | 2/2010 | Daveze et al. | |

OTHER PUBLICATIONS

Written Opinion of the International Searching Authority, for International Application No. PCT/FR2009/000307.

* cited by examiner

*Primary Examiner* — Phung Nguyen
(74) *Attorney, Agent, or Firm* — Novak Druce Connolly Bove + Quigg LLP

(57) ABSTRACT

According to the invention, as a function of the altitude, the vertical speed and the heading of the aircraft, as well as of the deviation of the actual trajectory of the aircraft with respect to the automatic trajectory, a time interval (T) is determined, during which it is tolerable for said aircraft to be able to fly without any control command, both on the part of the stick (1) and on that of said automatic pilot (2) and an alert is emitted for the attention of the crew in the case where it is noted that the absences of manual piloting and of automatic piloting extend simultaneously over a duration at least equal to said tune interval (T).

8 Claims, 3 Drawing Sheets

METHOD AND DEVICE FOR DETECTING ABSENCES OF MANUAL AND AUTOMATIC PILOTING OF AN AIRCRAFT

CROSS-REFERENCE TO RELATED APPLICATIONS

This application is a §371 national stage entry of International Application PCT/FR2009/000307, filed Mar. 23, 2009, which claims priority to French Patent Application 08/01637, filed Mar. 26, 2008, the entire contents of which are incorporated herein by reference.

FIELD OF THE INVENTION

This invention relates to a method and device for detecting absences of manual piloting and automatic piloting of an aircraft, and to an aircraft provided with such a device.

BACKGROUND OF THE INVENTION

It is known that most of the aircrafts, in particular civil transport airplanes, are equipped with an automatic pilot for controlling the trajectory according to set points being preset by the crew. Such an automatic pilot has the major advantage of decreasing the work load on the crew by relieving them from a part of the navigation task, during most of the flight phases. It is further known that connecting and disconnecting the automatic pilot are carried out by a voluntary action of the crew.

However, under some particular circumstances (breakdown, disturbances, etc.), the automatic pilot is caused to be disconnected by itself.

Regardless of the cause of the automatic pilot disconnection, the crew is informed about it through one or more audible alarms, as well as through visual changes on the piloting interfaces.

But, in spite of such visual and audible alerting systems, many cases are reported where the crews do not become aware of the automatic pilot disconnection, so either:
- the crew must face high or particular stressing work load situations which may alter their attention abilities and cause them to neglect alarms, such as those of automatic pilot disconnection;
- or a lack of comprehension within the crew in distributing the piloting task occurs;
- or the alarm for the automatic pilot disconnection is masked by a simultaneous alarm of higher priority (for example an alarm indicating that the aircraft is coming out of its flight envelope).

Besides, the existence of flight control laws, which stabilise the aircraft trajectory, can contribute to give the illusion that the automatic pilot is still operating and not cause the crew to check the condition of the automatic pilot.

Of course, it is particularly dangerous for the aircraft not to be piloted either by the crew, or by the automatic pilot.

Thus, the object of the present invention is to specifically detect such a situation and to inform the crew about it.

SUMMARY OF THE -INVENTION

For that purpose, according to the invention, the method for detecting absences of manual piloting and automatic piloting in an aircraft provided with at least a stick for manually controlling roll and pitch and with an automatic pilot in which an automatic trajectory is programmed, is remarkable in that:
- depending on the altitude, the vertical speed and the heading of said aircraft, as well as the deviation of the actual trajectory of the aircraft with respect to the automatic trajectory, a time interval is determined, during which it is tolerable for said aircraft to be able to fly without any control command, both on the part of the stick and on that of said automatic pilot;
- the absence of manual piloting by said stick is detected;
- the absence of automatic piloting by said automatic pilot is detected; and
- an alert is emitted for the attention of the crew of said aircraft in the case where it is noticed that said absences of manual piloting and automatic piloting last simultaneously over a period at least equal to said time interval.

For implementing this method, a device mounted on board said aircraft can include:
- calculating means, receiving information regarding at least the altitude, the vertical speed and the heading of said aircraft, as well as information regarding said automatic trajectory, said calculating means calculating a time interval during which it is tolerable for said aircraft to be able to fly without any control command, both on the part of the stick and on that of said automatic pilot;
- first means for detecting the absence of manual piloting by said stick;
- second means for detecting the absence of automatic piloting by said automatic pilot; and
- means for emitting an alert for the attention of the crew in the case where said first and second detection means simultaneously detect the absence of manual piloting and the absence of automatic piloting for a period at least equal to said time interval calculated by said calculating means.

The presence and absence of manual piloting can be detected respectively by the presence and absence of a pilot hand on said stick. In this case, contactors or pressure sensors mounted to said piloting sticks can be used.

Alternatively, or in addition, the presence and absence of manual piloting respectively can be detected by the presence and absence of roll and pitch control commands from said stick. In this case, means for detecting said control commands are provided.

When detecting the presence and absence of manual piloting, both by the presence and absence of the pilot hand on the stick and by means detecting the roll and pitch control commands, it is advantageous to emit said alert when, although detecting the presence of the pilot hand on said stick, the absence of said roll and pitch control commands from said stick and the existence of a deviation between the aircraft trajectory and the trajectory being programmed in said automatic pilot are noted simultaneously.

Said means for emitting said alert for the attention of the crew can include an alerting device and a controlling device of said alerting device and said controlling device can be a counter which receives, to count it, said time interval calculated by said calculating means and which is initialised by logic means receiving, directly or indirectly, signals generated by said first and second means for detecting the manual piloting and automatic piloting.

BRIEF DESCRIPTION OF THE DRAWINGS

The figures of the appended drawing will help better understand how the invention can be implemented. In these figures, identical references designate similar elements.

DETAILED DESCRIPTION

Figure 1:
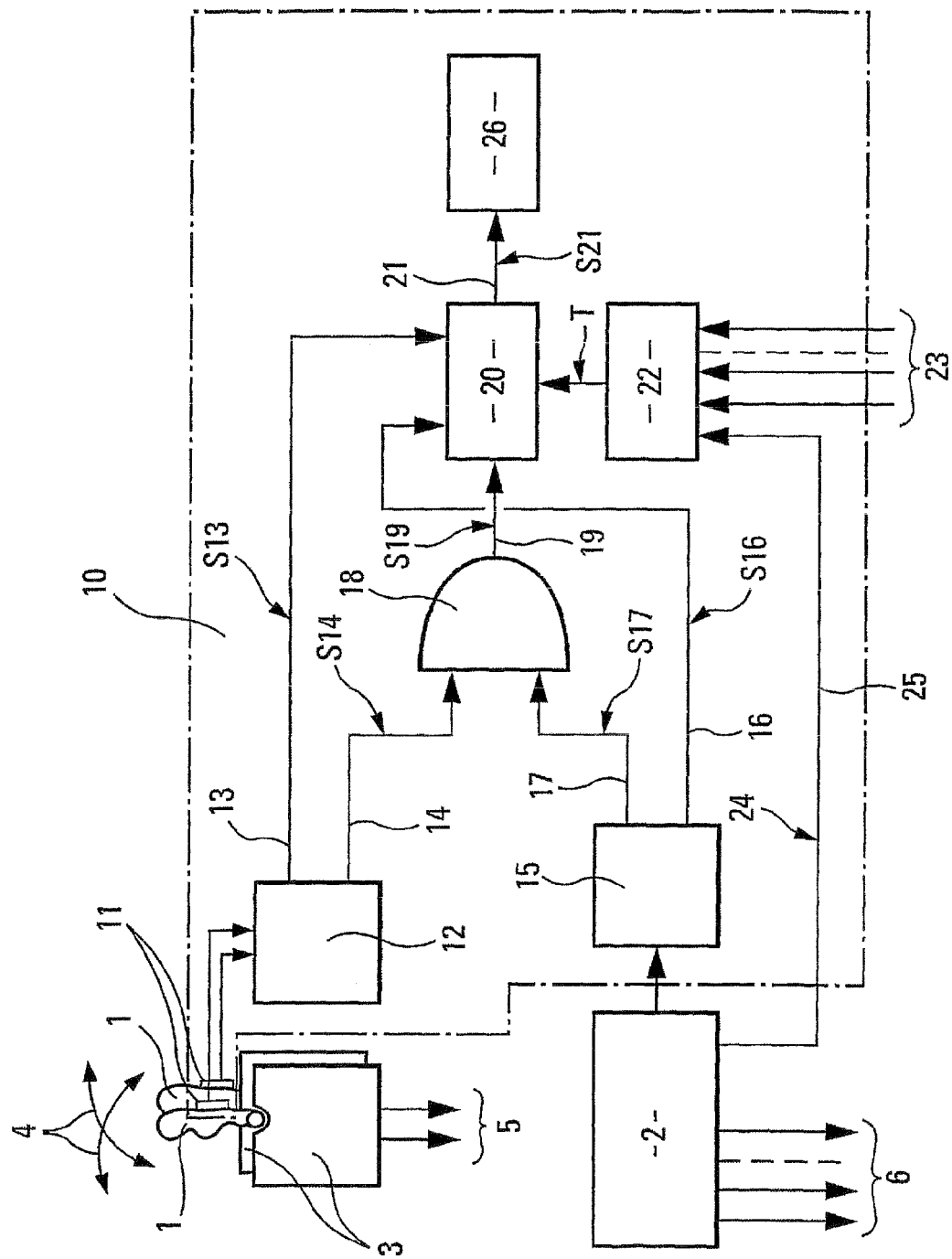
FIG. 1 schematically illustrates, in a block diagram, a first embodiment of the present invention.

On FIG. 1, there is schematically represented the piloting sticks 1 of the pilot and the co-pilot of an aircraft (not represented), as well as the automatic pilot 2 of the latter. The sticks 1 are connected to transducers 3 converting movements 4 of said sticks 1 into roll and pitch piloting commands 5 for said aircraft. The automatic pilot 2 is able to generate piloting commands 6 for the latter, based on a trajectory desired by the pilots they have programmed in said automatic pilot 2 as speed, altitude, heading data, etc.

Moreover, FIG. 1 shows a block diagram of one exemplary device 10 implementing the invention.

Such device 10 includes:
- sensors 11, such as contactors or pressure sensors, mounted to said sticks 1 and able to detect permanently the presence or absence of the pilots' hands on the sticks respectively;
- a detector 12, connected to the sticks 1 and able to generate, at the output 13 thereof, a signal S13 indicating that at least one of these sensors 11 detects the presence of a pilot's hand and, at the output 14 thereof, a signal S14 indicative of the fact that none of the contactors 11 is detecting the presence of such a hand;
- a detector 15, connected to the automatic pilot 2 and able, on the one hand, to detect the enabled condition (presence of commands 6) or the disabled condition (absence of commands 6) of the latter and, on the other hand, to generate, at the output 16 thereof, a signal S16 indicating that the automatic pilot 2 is enabled and, at the output 17 thereof, a signal S17 indicating that the automatic pilot 2 is disabled;
- a logic gate 18 of the AND type directly receiving at the inputs thereof said signals S14 and S17 and able to deliver, at the output 19 thereof, a signal S19 indicating that no pilot's hand is located on a stick 1 (namely said sticks are disabled) and the automatic pilot 2 is disabled itself;
- a counter 20, the countering start of which is controlled by said signal S19 and the reset of which is controlled by any of the signals S13 (coming from the detector 12) and S16 (coming from the detector 15), said counter 20 being able to generate, at the output 21 thereof, a countering end signal S21;
- a calculator 22, receiving several pieces of information 23 about the current condition of the aircraft, such as altitude, speed, vertical speed, heading, etc. as well as information 24 regarding the trajectory TR2 programmed by the pilots in the automatic pilot 2. For the latter purpose, the automatic pilot 2 and the calculator 22 are connected through a line 25. From the information 23 and 24, the calculator 22 can thus calculate the current deviation e (see FIG. 4) of the current trajectory TRa with respect to said trajectory TR2, programmed in the automatic pilot 2. Depending on the information 23 and said current deviation e, the calculator 22 calculates a counting time T which it addresses to said counter 20; and
- an alerting device 26, controlled by said signal S21 of the counter 20.

Thus, when the signal S19 appears at the output 19 of the gate 18 (which indicates that the sticks 1 and the automatic pilot 2 are simultaneously disabled), the counter 20 starts counting time T, calculated by the calculator 22. Therefore, there are two options:
- if during the counting of the time T by the counter 20, at least one of said signals S13 and S16 appears (which respectively means that one the sticks 1 is enabled again or that the automatic pilot 2 has become enabled again), the counter 20 stops counting the time T and is reset;
- on the contrary, if during said counting, none of said signals S13 or S16 appears, the counter 20 counts time T until the end and, at the end of said counting, it addresses the signal S21 to the alerting device 26, which generates a suitable alert for the attention of the pilots.

Thus, said alert is emitted when:
- the automatic pilot has been disabled (disconnected) since the time interval T; and
- none of the pilots on board has been manually acting on his/her stick 1 since this time interval T.

Figure 2:
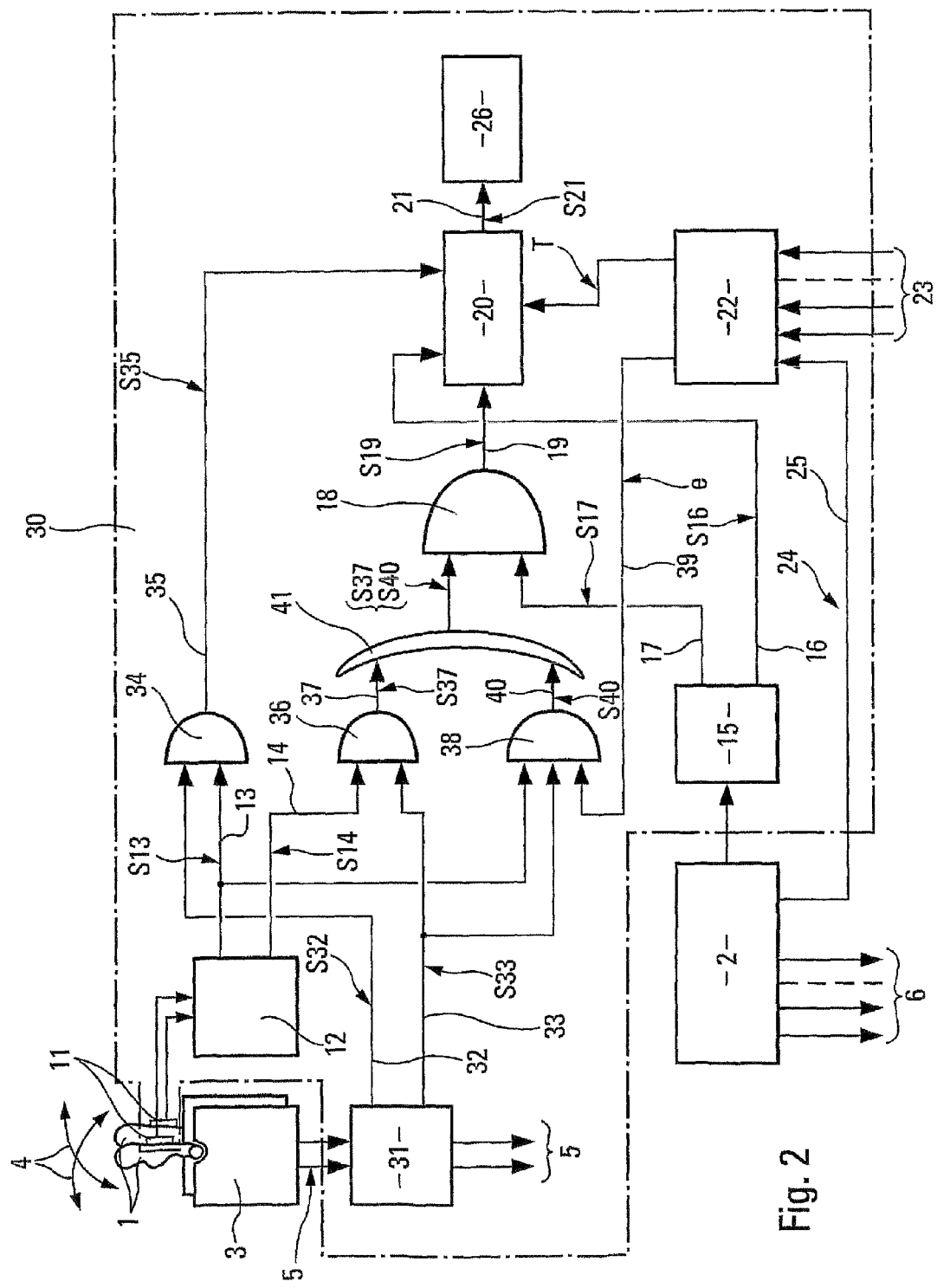
FIG. 2 is a block diagram of a second embodiment of the present invention.

In the alternative embodiment 30 of the device in accordance with the present invention, represented on FIG. 2, the elements 1-6 and 11-26 described with reference to FIG. 1 are present again. However, this device 30 further includes:
- a detector 31, connected to the transducers 3 and able to detect the roll and pitch commands 5 generated by the sticks 1 and to generate, at the output 32 thereof, a signal S32 indicating that the detector 31 detects the presence of commands 5 and, at the output 33 thereof, a signal S33 indicating that no command is detected;
- a logic gate 34 of the AND type receiving the signals S13 and S32 and delivering, at the output 35 thereof, a signal S35 indicating that at least one of the sticks 1 is held in hand by a pilot and that the result is a command 5 appearing. The signal S35 is addressed to the counter 20, in place of the signal S13 as shown on FIG. 1;
- a logic gate 36 of the AND type receiving the signals S14 and S33 and delivering, at the output 37 thereof, a signal S37 indicating that no stick 1 is held in hand by a pilot and no command 5 is generated by the transducers 3;
- a logic gate 38 of the AND type receiving the signals S13 and S33, as well as, through line 39, the trajectory deviation e calculated by the calculator 22, and delivering, at the output 40 thereof, a signal S40 indicating that, even though at least one stick 1 is held in hand by a pilot, there is no command 5 at the output of the transducers 3 and a trajectory deviation occurs; and
- a logic gate 41 of the OR type receiving said signals S37 and S40 and applying either of these signals to one of the inputs of the gate 18 (in place of the signal S14 as shown on FIG. 1) the other output of which receives (as previously set out), the signal S17.

Thus, the gate 18 is directly connected to the detector 15, but indirectly (through the gates 36, 38, 41) to the detectors 12 and 21, and the signal S19, appearing at the output 19 of said gate 18 and triggering counting by the counter 20 indicates:
- either that, simultaneously, no stick 1 is held in hand by a pilot and no roll or pitch command 5 appears at the output of the detector 31;
- or that, even though at least one of the sticks 1 is held in hand by a pilot, no roll or pitch command 5 appears at the output of the detector 31, while a trajectory deviation e occurs.

Thus, unless the counting carried out by the counter 20 is stopped due to at least one pilot holding again a stick 1 in hand (signal S35) or unless the automatic pilot 2 becomes enabled again, the device 26 emits an alert when the following conditions are met:

the automatic pilot 2 is disconnected since the time interval T, calculated by the calculator 22;

none of the pilots manually acts on the stick 1 during this time interval T:

either because the sensors 11 detect the absence of a pilot's hand on a stick 1 and the detector 31 detects the absence of a pitch and roll command 5;

or because, even though the sensors 11 detect the presence of at least one pilot's hand on a stick 1, the detector 31 detects no pitch and roll command 5, while the calculator 22 notes a deviation e of the current trajectory TRa from the trajectory TR2 programmed in the automatic pilot 2.

Figure 3:
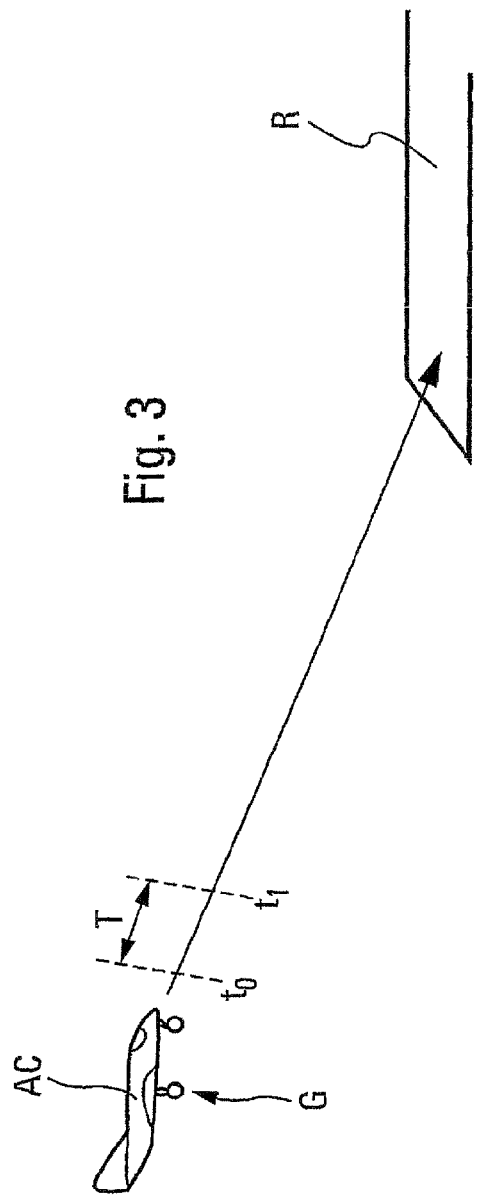
FIGS. 3 and 4 illustrate two examples for implementing the present invention.
Figure 4:
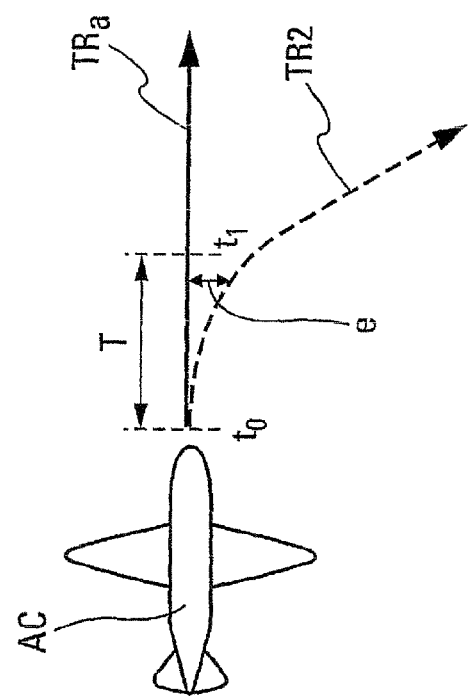

FIGS. 3 and 4 illustrate two situations (among others but not shown) wherein the present invention contributes to improving flight safety.

On FIG. 3, there is shown an aircraft AC, on board of which is mounted one of the devices 10 or 30 described above. The aircraft AC is about to land onto a runaway R. The automatic pilot 2 thereof is connected and the landing gear thereof is extended. At the time to, the automatic pilot 2 is disconnected and the crew does not become aware of it for at least one of the reasons recited above. The device 10 or 30 detects this abnormal situation and estimates a time interval T at the end of which (time t1) an alert is emitted by the device 26 if the crew has still not taken control 1 again or reconnected the automatic pilot 2. In this precise case, it is needless to say that the time interval T assessed by the calculator 22 is short because the altitude of the aircraft AC is low and its rate of descent is high.

In the example of FIG. 4, the aircraft AC is in a cruise phase, the automatic pilot 2 is connected for controlling the trajectory TR2. For at least one of the reasons recited above, at the time t0, the automatic pilot 2 is disconnected and the crew does not become aware of it.

The aircraft AC gradually deviates from the trajectory TR2 programmed in the automatic pilot 2 to continue on a rectilinear trajectory TRa: the device 10 or 30 detects this abnormal situation and assesses a time interval T at the end of which (time t1) an alert is emitted by the device 26 if the crew has still not taken the control 1 again or reconnected the automatic pilot 2. In this precise case, the time interval T assessed by the calculator 22 is even shorter given that the deviation e from the trajectory TR2 intended by the automatic pilot 2 is larger.

The invention claimed is:

1. A method for detecting absences of manual piloting and automatic piloting on an aircraft (AC) provided with a stick (1) for manually controlling roll and pitch and with an automatic pilot (2) in which an automatic trajectory (TR2) is programmed, comprising:

depending the altitude, the vertical speed and the heading of said aircraft (AC), as well as the deviation (e) of the actual trajectory (TRa) of the aircraft (AC) with respect to said automatic trajectory (TR2), a time interval (T) is determined, during which it is tolerable for said aircraft (AC) to be able to fly without any control command, both on the part of the stick and on that of said automatic pilot;

the absence of manual piloting by said stick (1) is detected;

the absence of automatic piloting by said automatic pilot (2) is detected; and an alert is emitted for the attention of the crew of said aircraft (AC) where said absences of manual piloting and automatic piloting last simultaneously over a period at least equal to said time interval (T).

2. The method according to claim 1, wherein the presence and absence of manual piloting are detected respectively by the presence and absence of the pilot's hand on said stick.

3. The method according to claim 2, wherein the presence and absence of manual piloting are detected respectively by the presence and absence of roll and pitch control commands coming from said stick.

4. The method according to claim 2, wherein said alert is emitted when, even though the presence of the pilot hand on said stick is detected, the absence of said roll and pitch control commands from said stick and the existence of a deviation between the aircraft trajectory and said trajectory being programmed in said automatic pilot are noted simultaneously.

5. A device for implementing the method set out according to claim 1, on board an aircraft provided with at least one stick (1) for manually controlling roll and pitch and with an automatic pilot (2) in which an automatic trajectory is programmed, comprising:

calculating means (22) receiving information (23) regarding at least the altitude, the vertical speed and the heading of said aircraft, as well as information (24) regarding said automatic trajectory, said calculating means (22) calculating a time interval (T) during which it is tolerable for said aircraft to be able to fly without any control command, both on the part of the stick and on that of said automatic pilot;

first means (11, 12) for detecting the absence of manual piloting by said stick (1);

second means (15) for detecting the absence of automatic piloting by said automatic pilot (2); and means (20, 26) for emitting an alert for the attention of the crew in the case where said first (11, 12) and second (15) detection means simultaneously detect the absence of manual piloting and the absence of automatic piloting for a period at least equal to said time interval (T) calculated by said calculating means (22).

6. The device according to claim 5, wherein said means (20, 26) for emitting said alert for the attention of the crew include an alerting device (26) and a controlling device (20) of said alerting device (26) and in that said controlling device (20) is a counter which receives, and counts said time interval (T) calculated by said calculating means (22) and which is initialised by logic means (18) receiving, directly or indirectly, signals generated by said first (11, 12) and second (15) detection means.

7. The device according to claim 6 for implementing the method according to claim 4, comprising means (31) for detecting the commands of automatic piloting (5) generated by said automatic pilot (2) and connected to said logic means (18, 34, 36, 38, 41), as well as a link (39) for transferring said trajectory deviation between said calculating means (22) and said logic means.

8. An aircraft, comprising a device as set out according to claim 5.

* * * * *